United States Patent
Grontved et al.

(10) Patent No.: US 9,452,443 B2
(45) Date of Patent: Sep. 27, 2016

(54) MOTORIZED VISCOUS MATERIAL DISPENSER AND A METHOD IF OPERATING A DISPENSER

(71) Applicant: Sulzer Mixpac Denmark A/S, Greve (DK)

(72) Inventors: Martin Grontved, Harlev (DK); Jorgen Elmelund, Birkerod (DK)

(73) Assignee: Sulzer Mixpac Denmark A/S, Greve (DK)

( * ) Notice: Subject to any disclaimer, the term of this patent is extended or adjusted under 35 U.S.C. 154(b) by 95 days.

(21) Appl. No.: 14/370,413

(22) PCT Filed: Dec. 27, 2012

(86) PCT No.: PCT/DK2012/050508
§ 371 (c)(1),
(2) Date: Jul. 2, 2014

(87) PCT Pub. No.: WO2013/104362
PCT Pub. Date: Jul. 18, 2013

(65) Prior Publication Data
US 2015/0014351 A1    Jan. 15, 2015

(30) Foreign Application Priority Data

Jan. 12, 2012   (DK) ................................ 2012 70020

(51) Int. Cl.
| | | |
|---|---|---|
| *B67B 7/00* | (2006.01) | |
| *G01F 11/00* | (2006.01) | |
| *B05C 17/01* | (2006.01) | |
| *B05B 12/00* | (2006.01) | |
| *B05B 12/02* | (2006.01) | |
| *B05C 11/10* | (2006.01) | |
| *G01F 11/02* | (2006.01) | |
| *B05C 17/005* | (2006.01) | |

(52) U.S. Cl.
CPC ......... *B05C 17/0116* (2013.01); *B05B 12/002* (2013.01); *B05B 12/004* (2013.01);
(Continued)

(58) Field of Classification Search
CPC ........... B05C 17/0116; B05C 17/0052; B05C 17/0103; B05C 11/1002; B05B 12/002; B05B 12/004; B05B 12/02; G01F 11/022; G01F 11/023; G01F 11/006
USPC ................ 222/1, 333, 52, 63, 23, 30, 36, 37
See application file for complete search history.

(56) References Cited

U.S. PATENT DOCUMENTS

| | | | |
|---|---|---|---|
| 5,273,187 A | 12/1993 | Suzuki | |
| 6,237,811 B1 * | 5/2001 | Ford | A47J 31/401 222/129.1 |

(Continued)

FOREIGN PATENT DOCUMENTS

| | | |
|---|---|---|
| DE | 4241092 A1 | 6/1994 |
| DE | 202004003925 U1 | 5/2004 |

(Continued)

OTHER PUBLICATIONS

Danish Search Report for Danish Application No. PA 2012 70020 mailed Sep. 21, 2012.

*Primary Examiner* — J. Casimer Jacyna
*Assistant Examiner* — Benjamin R Shaw
(74) *Attorney, Agent, or Firm* — Larson & Anderson, LLC

(57) ABSTRACT

A motorized viscous material dispenser, especially a caulking gun, comprises a motor (27), an operation parameter sensor (51), a data processing device (35), a memory device (37), and at least one operator activated switch (7, 10). The dispenser has a first dispensing mode in which the data processing device (53) records operation parameter values read by the operation parameter sensor (51), when a switch (7) is activated by an operator, and stores at least one operation parameter value in the memory device (37), the motor (27) being activated in accordance with the activation of said switch (7), and a second dispensing mode in which the data processing device (35) activates the motor (27) in accordance with the operation parameter values stored in the memory device (37) when a switch (7) is activated by an operator.

18 Claims, 4 Drawing Sheets

Figure 3:
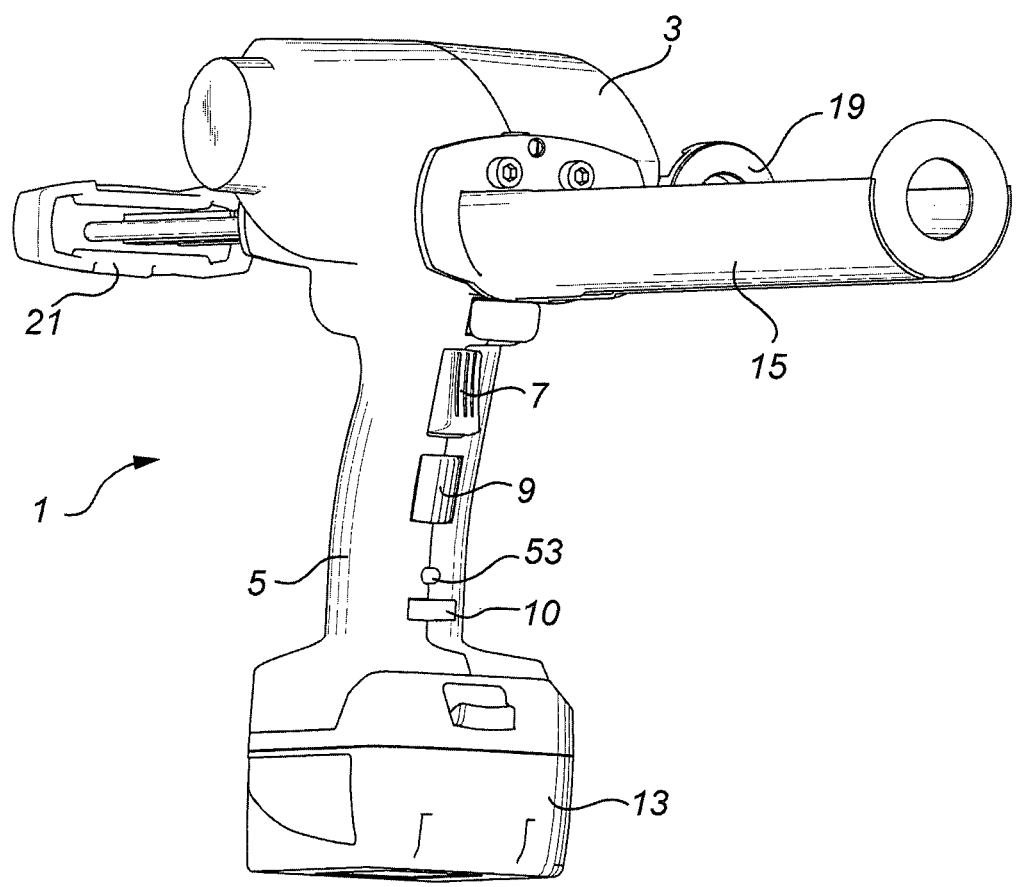

(52) U.S. Cl.
CPC .......... *B05B 12/02* (2013.01); *B05C 11/1002* (2013.01); *B05C 17/0052* (2013.01); *B05C 17/0103* (2013.01); *G01F 11/022* (2013.01); *G01F 11/023* (2013.01)

(56) References Cited

U.S. PATENT DOCUMENTS

| | | | |
|---|---|---|---|
| 7,228,874 B2 * | 6/2007 | Bolderheij | E03C 1/04 137/801 |
| 8,020,727 B2 | 9/2011 | Herman et al. | |
| 2003/0022128 A1 | 1/2003 | Heymann et al. | |
| 2003/0080152 A1 | 5/2003 | Balcome et al. | |
| 2008/0047974 A1 * | 2/2008 | Glasgow | B05C 17/00503 222/63 |
| 2009/0134075 A1 * | 5/2009 | Underwood | C02F 1/008 210/87 |
| 2010/0001017 A1 * | 1/2010 | Herman | B05C 17/0103 222/1 |

FOREIGN PATENT DOCUMENTS

| | | |
|---|---|---|
| EP | 1279379 A1 | 1/2003 |
| EP | 1834603 A1 | 9/2007 |
| WO | 00/59643 | 10/2000 |

* cited by examiner

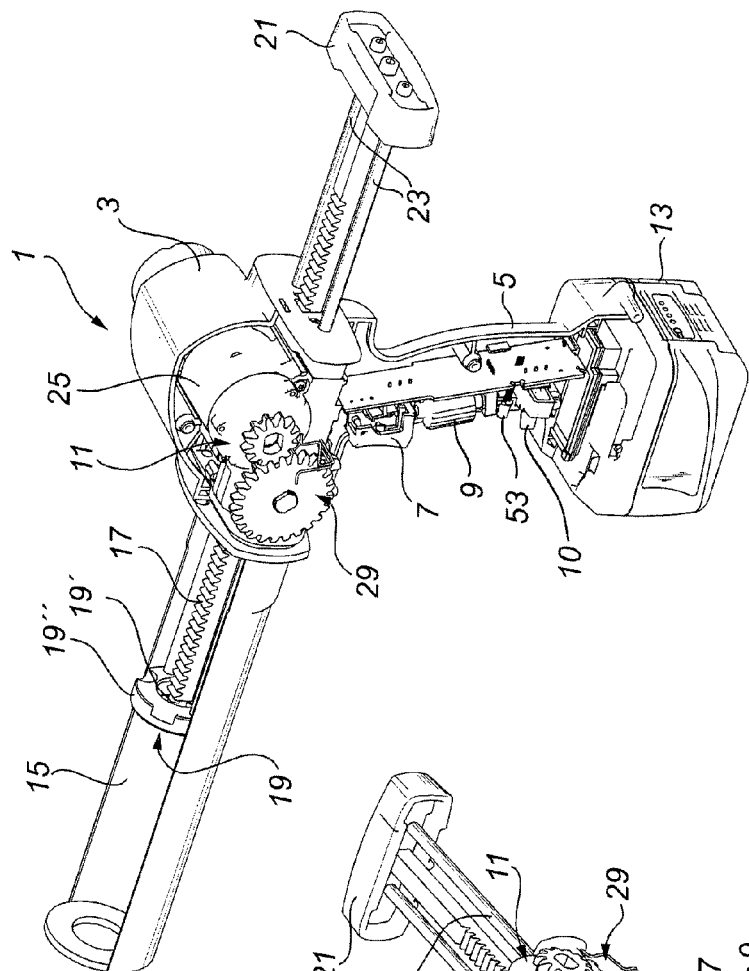
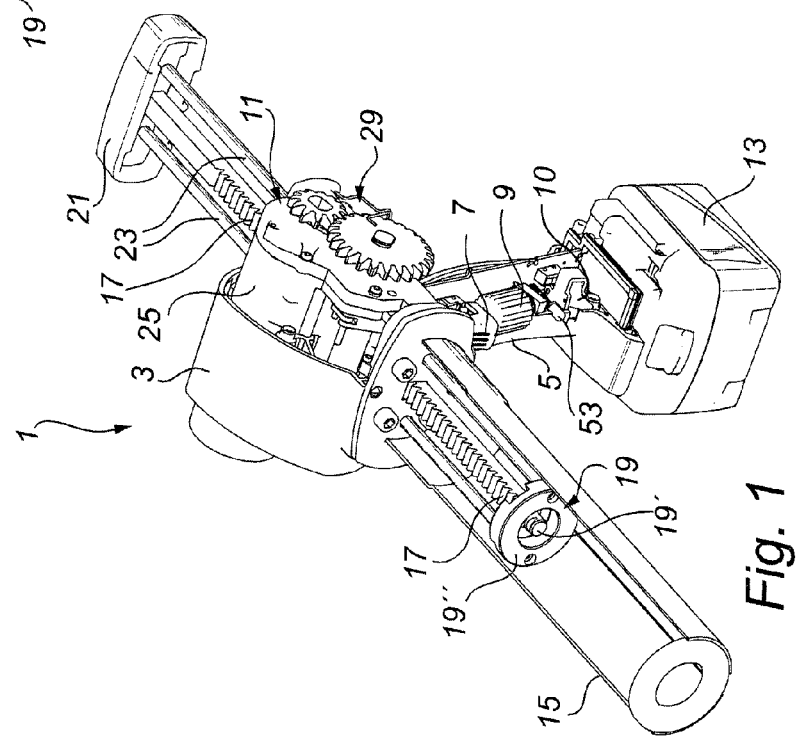

MOTORIZED VISCOUS MATERIAL DISPENSER AND A METHOD IF OPERATING A DISPENSER

The present invention relates to a motorized viscous material dispenser, especially a caulking gun, comprising a motor, an operation parameter sensor, a data processing device, a memory device, and at least one operator activated switch.

U.S. Pat. No. 8,020,727 discloses a caulking gun of the above art provided for monitoring and controlling motor current in order to i.a. avoid excessive load, provide for soft start, provide for variable auto-reverse and provide for battery conversation. The data processing device may modify the memory during use the data thus stored being extractable to be used e.g. for diagnosis in case of tool failure, learning about typical applications, verifying in-warrantee status, and tracking run time and number of cycles for various applications including rental. The operator activated switches comprise a trigger, a clutch trigger, and a speed dial.

DE-U-20 2004 003 925 discloses another caulking gun with a pre-programmable controller, which is programmable e.g. by means of a household computer. Amongst programmable parameters are e.g. dispensing and retraction speed, distance (absolute or relative), acceleration and retardation, etc.

The object of the present invention is to provide a versatile dispenser for viscous material and a novel method of operating such a dispenser.

Thus according to the invention a motorized viscous material dispenser, especially a caulking gun, comprising a motor, an operation parameter sensor, a data processing device, a memory device, and at least one operator activated switch, is characterised by said dispenser having a first dispensing mode in which the data processing device records operation parameter values read by the operation parameter sensor, when a switch is activated by an operator, and stores at least one operation parameter value in the memory device, the motor being activated in accordance with the activation of said switch, and a second dispensing mode in which the data processing device activates the motor in accordance with the operation parameter values stored in the memory device when a switch is activated by an operator.

A basic idea of the invention is that an operator, i.e. a human operating the dispenser, should be able to repeat in a simple way a given task of dispensing. An example of such a task could be to fill a viscous material, such as glue, into a number of similar holes for anchorage of similar elements in either of said holes. A dispenser according to the invention e.g. allows the operator to manually control the dispenser in the first dispensing mode to dispense an amount of material into a hole, and subsequently switch to the second dispensing mode to automatically dispense a similar amount of material into other holes.

In some embodiments the dispenser comprises at least two operator activated switches.

In an embodiment the operator activated switches comprise a trigger switch and a dispensing mode selection switch. This allows the operator to select the operation mode or dispensing mode using the dispensing mode selection switch and subsequently operate the dispenser to dispense material using the trigger switch.

In another embodiment the operator activated switches comprise a first dispensing mode trigger switch and a second dispensing mode trigger switch. This allows the operator to select the dispensing mode by activating when dispensing material either the first dispensing mode trigger switch or the second dispensing mode trigger switch. The first dispensing mode trigger switch and a second dispensing mode trigger switch may be combined in a single rocker button to avoid mal-operation, said rocker button having a neutral position and two oppositely rotated positions in either of which respectively the first and the second dispensing mode are activated.

In an embodiment the dispenser comprises a piston for driving the material to be dispensed the operation parameter sensor sensing a value indicative of a change of position of the piston. The change of position of the piston provides in a simple way a measure of the amount of material dispensed in the first dispensing mode and thus providing in the second dispensing mode for a similar change of the position of the piston will provide within reasonable tolerances for dispensing an amount of material similar to the amount of material dispensed in the first dispensing mode.

In an embodiment a revolution counter is provided counting revolutions of a rotating element of a drive train extending from the motor to the piston. This provides in a simple way a value indicative of the change of position of the piston.

In an embodiment a movement sensor is provided by a pulse generator attached to a moving element of a drive train extending from the motor to the piston, including the motor and the piston, generating pulses at regular steps of movement of the moving element, and a data processing device counting pulses provided by the pulse generator. Such technique is generally known e.g. from digital sliding calipers.

In another aspect according to the invention a method of operating a motorized viscous material dispenser comprises selecting a first dispensing mode, recording at least one operation parameter value while dispensing material at a dispensing event in accordance with an operator's operation of the dispenser and storing at least one operation parameter value indicative of the dispensing event, selecting a second dispensing mode and operating in said second dispensing mode by dispensing upon operation by an operator material in accordance with the at least one stored operation parameter value.

In an embodiment of operating a dispenser comprising a piston for driving the material to be dispensed, said operation parameter value is a value indicative of a change of position of the piston.

In an embodiment the at least one operation parameter comprises a count of revolutions during the dispensing event of a rotating element of a drive train extending from a motor to a piston.

In an embodiment of operating a motorized viscous material dispenser comprising a trigger switch, said method comprises registration upon activation of said trigger switch a start of a dispensing event and registration upon deactivation of said trigger switch an end of said dispensing event. Hereby in a simple way a dispensing event is defined by the operator e.g. pulling the trigger (start of dispensing event) and releasing the trigger (end of dispensing event).

In an embodiment dispensing is terminated upon termination of operation by the operator. Hereby the operator is able always to control termination of a dispensing event, even in the second dispensing mode when the dispensing is stopped automatically e.g. after dispensing an amount of material corresponding to the at least one operation parameter value. Usually the operator generally terminates operation by releasing the switch activated by him or her to dispense material in the first or the second dispensing mode.

Figure 4:
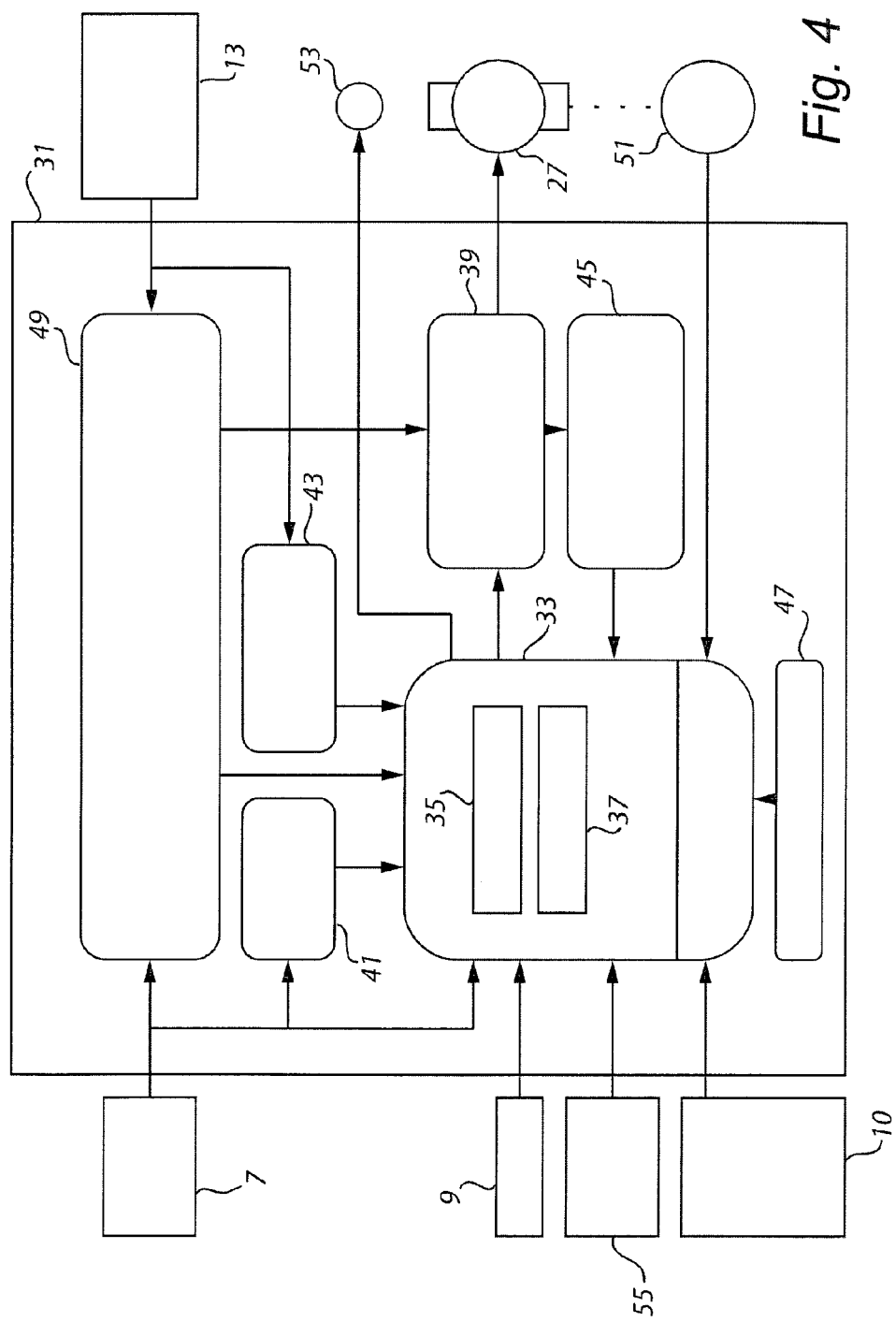
Figure 5:
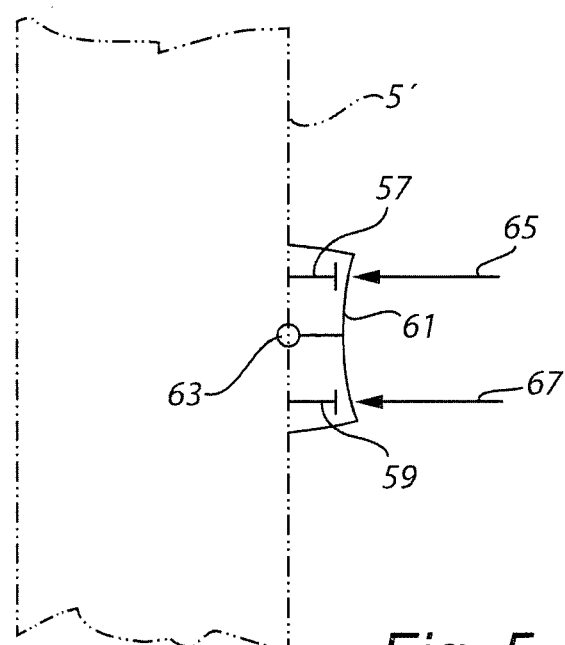

In the following the invention will be described in further detail by way of examples with reference to the accompanying drawings, in which FIG. 1 shows an embodiment of a caulking gun obliquely from the front and from above, FIG. 2 shows the caulking gun oblique from the rear and from above, FIG. 3 shows the caulking gun in a horizontal view, FIG. 4 is a diagram of the caulking gun including a control, and FIG. 5 shows a trigger rocker button in a different embodiment of a caulking gun.

Figure 6:
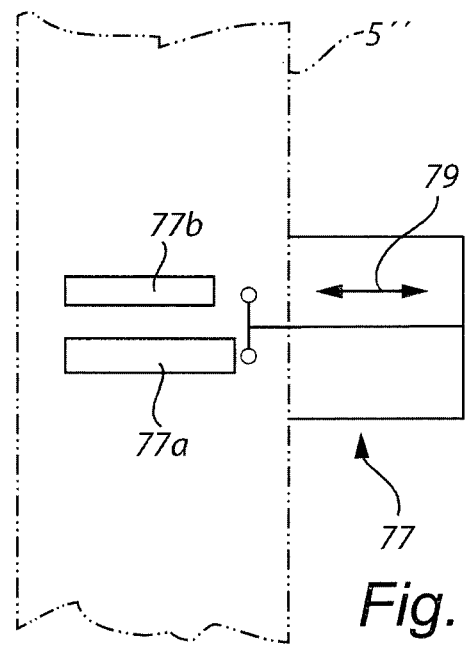

FIG. 6 shows a handle embodiment of a caulking gun in accordance with the present invention.

FIGS. 1, 2 and 3 show a motorized viscous material dispenser 1 in an embodiment of the kind, which often is referred to as a caulking gun. It comprises a housing 3, part of which is left out in FIGS. 1 and 2 to show interior parts, said housing providing a handle 5 to be grabbed by an operator for operating the dispenser to dispense material. At the handle the dispenser comprises a trigger switch or trigger 7, a speed control dial 9 and an operation mode selection switch in the form of an on/off mode switch 10. The housing 3 accommodates a drive unit 11. At the bottom of the housing 3 a rechargeable battery pack 13 is attached in a manner normal for portable electric tools. Alternatively the dispenser may e.g. be provided with a cord for connection with a power source such as lighting mains.

At a front end of the housing 3 and the drive unit 11 a holder 15 for a container of viscous material to be dispensed is mounted. Thus the holder 15 defines the front end of the dispenser 1. The container of viscous material may be of any kind e.g. of cartridge type or of sausage type, which are types well known in the art.

The dispenser 1 further comprises a rack 17, which at a front end is carrying a piston 19 for driving the viscous material for dispensing the same as it is well known by the skilled person. The rack 17 is extending through the drive unit 11 and at a rear end opposite the front end the rack 17 is attached to a second handle 21. Guide rods 23 are extending parallel to the rack 17 between the piston 19 and the second handle 21. In the present embodiment the piston 19 is a coaxial piston and comprises a first central piston part 19' constituted by the end of the rack 17 and a second annular piston part 19", which is supported by the guide rods 23. Being connected through the second handle 21 the rack 17 and the guide rods 23, and thus the first and the second piston parts 19' and 19", move in unison. The dispenser of the embodiment shown may be used with a container of viscous material containing only one component of viscous material and with a container of viscous material, a so-called coaxial container, containing two components of viscous material arranged coaxially in the container and separated by an annular partition inside the container.

The drive unit 11 comprises a drive unit housing 25 accommodating a DC motor 27 (see FIG. 4) driving through a gear train 29 a cylindrical pinion gear meshing inside the drive unit 11 with the rack 17 to drive the latter.

Referring to FIG. 4 the dispenser comprises a control unit 31 with a logic control 33 including a data processing device 35 and a memory device 37, a bi-directional DC motor driver 39, and additional functions that does not as such form part of the present invention, namely a torque control 41 for avoiding excess torque that could result in a mechanical breakdown, a battery monitor 43, a temperature monitoring system 45 for avoiding excess temperature e.g. in the DC motor, a self test function 47, and an on/auto off switch 49. The DC motor 27 is provided with a revolution counter provided by a pulse generator 51 attached to the DC motor 27 and the data processing device 35 counting the pulses provided by the pulse generator 51. An LED indicator 53 is provided for indicating specific conditions.

For input to the control unit 31 the dispenser 1 further comprises the trigger 7, the speed control dial 9 and the on/off mode switch 10, and also an end-stop switch 55 for indicating an end position of the rack 17.

The dispenser may be adapted in any way for retraction of the rack 17 and piston 19 for exchange of the container with the material to be dispensed as it is usual for dispensers of the kind in question.

In use i.e. with a container of viscous material to be dispensed mounted in the holder the dispenser can be operated by an operator as follows.

The operator uses the on/off mode switch 10 to select a first dispensing mode (off) or a second dispensing mode (on).

In the first dispensing mode the operator pulls the trigger 7 to dispense material from the container. Pulling the trigger 7 activates the on/auto off switch 49 to turn the control unit 31 on, and activates the logic control 33 to reset the memory device 37 and start driving the DC motor 27 through the DC motor driver 39. The DC motor 27 drives the rack 17 and the piston 19 through the gear train 29 and the pinion gear (not shown) whereby material to be dispensed is expelled from the container as it is known per se. The pulse generator 51 provides a pulse per revolution of the DC motor 27 and while the DC motor 27 is running the data processing device 35 counts the pulses received from the pulse generator 51 and up-dates the memory device 37, which thus stores the number of revolutions performed by the DC motor since the trigger 7 was pulled, and when the operator releases the trigger 7 the logic control 33 registers the end of a dispensing event and the memory device 37 stores the number of revolutions performed by the DC motor 27 during the dispensing event.

The operator may pull the trigger 7 again in a second dispensing event and the above series of actions are performed once again including resetting the memory device 37, which thus at the end of the second dispensing event stores the number of revolutions performed by the DC motor 27 during the second dispensing event.

When the operator has performed a dispensing event to his or her satisfaction and wishes to repeat the dispensing event e.g. to fill a hole with the same amount of material as during the latest dispending event, the operator switches the on/off mode switch 10 to select the second dispensing mode.

In the second dispensing mode the memory device 37 is not reset in relation to the number of revolutions performed during the latest dispensing event in the first dispensing mode when the trigger 7 is pulled, but the logic control 33 activates the DC motor to drive the rack 17. The logic control 33 counts the number of revolutions performed by the DC motor 27 since the trigger 7 was pulled and when the number of revolutions equals the stored number of revolutions performed during the latest dispensing event in the first dispensing mode the logic control 33 stops the DC motor 27 and registers the end of a dispensing event in the second dispensing mode. Should the operator release the trigger 7 before the logic control 33 stops the DC motor 27 then the DC motor 27 is stopped and the logic control 33 registers the end of a dispensing event in the second dispensing mode.

When the logic control 33 registers the end of a dispensing event it may activate through the DC motor driver 39 the DC motor 27 to reverse a given number of revolutions in order to relieve a pressure in the container with the material to be dispensed in order to minimize the risk of material oozing from the dispenser and to facilitate retraction of the rack 17 and piston 19 for exchange of the container with the material to be dispensed. If the DC motor 27 is reversed in this manner in the first dispensing mode as well as the second dispensing mode no special precautions need to be taken. However if the DC motor 27 is only reversed when operating in the second dispensing mode the number of reversed revolutions should be added to the number of revolutions performed in the latest event of dispensing in the first dispensing mode when the dispenser is activated other than the first time in the second dispensing mode to recover the reversed revolutions before repeating the dispensing of said latest event.

When the operator wishes to regain control of the dispensing he or she switches the on/off mode switch 10 back to select the first dispensing mode.

The LED indicator 53 may indicate one or more of a number of specific conditions such as, first dispensing mode activated, second dispensing mode activated, low or full battery charge, overload (torque), high temperature, end-stop switch 55 activated, etc.

The speed control dial 9 is used by the operator to set a maximum speed of the DC motor 27 and thus of the rack 17 and the piston 19. The trigger 7 may be embodied as an on/off switch in relation to the activation of the DC motor 27 or it may be provided for "soft" start and/or speed regulation dependent on degree of depression as it is generally known in the art of electric manual tools.

Using the dispenser according to the present invention an operator is able in a convenient manner to repeat a dispensing task. Though a specific embodiment has described above with reference to the drawing is should be understood that the invention is not restricted to said embodiment. Especially the skilled person will recognise that other operation parameters may be used for establishing a measure of the performance in the first dispensing mode in order to repeat that performance in the second dispensing mode. Thus the motor current and voltage may be used to establish the torque of the motor and combining the torque with the time of operation during a dispensing event a measure of the performance may be calculated.

Relating to the embodiment described above it should be noted that whereas the pulse generator 51 is attached to the DC motor 27 for counting the revolutions of said DC motor 27 it is also possible to attach the pulse generator to an element of the gear train 29 or the pinion gear driving the rack 17. However due to the gearing the DC motor makes the most rotations in relation to the distance of the movement of the rack 17 for which reason attaching the pulse generator 51 to the DC motor provides the highest resolution of the measurement of the movement of the rack 17 and the piston 19. It is also possible to attach a pulse generator to the rack 19 or one of the guide rods 23 to read the movements thereof using a technique e.g. known from sliding callipers.

FIG. 5 shows an alternative to the handle 5 with the trigger 7 and the on/off mode switch 10 for selecting the first and the second dispensing mode. Thus FIG. 5 shows part of a handle 5' with two triggers 57 and 59 combined with a rocker button 61 rotatable around a hinge 63 between a neutral position as shown and two tilted positions. The rocker button is biased towards the neutral position.

In a first tilted position the upper part of the rocker button 61 is depressed as indicated by arrow 65. Thereby the rocker button 61 is rotated counter-clockwise as seen in FIG. 5 and the first trigger 57 is activated. Hereby the dispenser is activated in the first dispensing mode as described above.

In a second tilted position the lower part of the rocker button 61 is depressed as indicated by arrow 67. Thereby the rocker button 61 is rotated clockwise as seen in FIG. 5 and the second trigger 59 is activated. Hereby the dispenser is activated in the second dispensing mode as described above.

Accordingly the operator selects the first and the second dispensing mode by depressing the upper and the lower part of the rocker button 61 instead of selecting the dispensing mode by means of the on/off mode switch 10.

The skilled person will easily realise other ways of providing for change between the first dispensing mode and the second dispensing mode.

E.g. FIG. 6 illustrates a handle 5" of a contemplated embodiment comprising a single trigger button 77 activating two trigger switches 77a and 77b at different depressed positions of the trigger button 77, cf. double arrow 79. The first trigger switch 77a may be a main switch activating the on/auto off switch 49 of the control unit 31 and the second trigger switch 77b may comprise a potentiometer activating the torque control 41 of the control unit 31 to run the DC motor at a speed depending on the position of the trigger button 77 and thus the potentiometer. The logic control 33 may provide for running the dispenser in a given dispensing mode upon depression of the trigger button 77 whereby both trigger switched 77a and 77b are activated, and for switching between the first and the second dispensing mode, and vice versa, upon depression of the trigger button 77 for activation of only the first trigger switch 77a and subsequently release of said first trigger switch 77a without the second trigger switch 77b having been activated. The logic control 33 may alternatively provide for switching between the first and the second dispensing mode, and vice versa, upon two short depressions of the trigger button 77 for activation of the first trigger switch 77a. The latter mode of switching between the first and the second dispensing mode may also be applied using a single trigger button activating only one trigger switch having the function of activating both the on/auto off switch 49 and the torque control 41, said only one trigger switch possibly comprising a potentiometer activating the torque control 41 to provide for running the dispenser at different speeds.

The invention claimed is:

1. A motorized viscous material dispenser (1), comprising a motor (27), an operation parameter sensor (51), a data processing device (35), a memory device (37), and at least two operator activated switches (7, 10; 57, 59), said dispenser having a first dispensing mode in which the data processing device (35) records operation parameter values read by the operation parameter sensor (51), when a switch (7; 57) is activated by an operator, and stores at least one operation parameter value in the memory device (37), the motor (27) being activated in accordance with the activation of said switch (7; 57), and a second dispensing mode in which the data processing device (35) activates the motor (27) in accordance with the operation parameter values stored in the memory device (37) when a switch (7; 59) is activated by an operator,
wherein said operator activated switches comprise a first dispensing mode trigger switch (57) and a second dispensing mode trigger switch (59).

2. The dispenser according to claim 1, wherein the dispenser is a caulking gun.

3. The dispenser according to claim 1, wherein said operator activated switches comprise a trigger switch (7) and an operation mode selection switch (10).

4. The dispenser according to claim 1, wherein the dispenser comprises a piston (19) for driving the material to be dispensed and the operation parameter sensor (51) sensing a value indicative of a change of position of the piston (19).

5. The dispenser according to claim 4, wherein a revolution counter (51) is provided counting revolutions of a rotating element of a drive train extending from the motor (27) to the piston (19).

6. The dispenser according to claim 4, wherein a movement sensor is provided by a pulse generator (51) attached to a moving element (27) of a drive train extending from the motor (27) to the piston (19), including the motor and the piston, generating pulses at regular steps of movement of the moving element, and a data processing device (35) counting pulses provided by the pulse generator (51).

7. A method of operating a motorized viscous material dispenser (1), comprising selecting a first dispensing mode, recording at least one operation parameter value while dispensing material at a dispensing event in accordance with an operator's operation of the dispenser and storing at least one operation parameter value indicative of the dispensing event, selecting a second dispensing mode and operating in said second dispensing mode by dispensing upon operation by an operator material in accordance with the at least one stored operation parameter value,
wherein the dispenser comprises a piston (19) for driving the material to be dispensed, wherein said operation parameter value is a value indicative of a change of position of the piston (19).

8. The method according to claim 7, wherein the at least one operation parameter comprises a count of revolutions during the dispensing event of a rotating element of a drive train (29) extending from a motor (27) to a piston (19).

9. The method according to claim 7 of operating a motorized viscous material dispenser (1) comprising a trigger switch (7; 57, 59) said method comprising registration upon activation of said trigger switch a start of a dispensing event and registration upon deactivation of said trigger switch an end of said dispensing event.

10. The method according to claim 7, wherein dispensing is terminated upon termination of operation by the operator.

11. A motorized viscous material dispenser (1), comprising a motor (27), an operation parameter sensor (51), a data processing device (35), a memory device (37), and at least one operator activated switch (7, 10; 57, 59), said dispenser having a first dispensing mode in which the data processing device (35) records operation parameter values read by the operation parameter sensor (51), when a switch (7; 57) is activated by an operator, and stores at least one operation parameter value in the memory device (37), the motor (27) being activated in accordance with the activation of said switch (7; 57), and a second dispensing mode in which the data processing device (35) activates the motor (27) in accordance with the operation parameter values stored in the memory device (37) when a switch (7; 59) is activated by an operator,
wherein the dispenser comprises a piston (19) for driving the material to be dispensed and the operation parameter sensor (51) sensing a value indicative of a change of position of the piston (19).

12. The dispenser according to claim 11, wherein a revolution counter (51) is provided counting revolutions of a rotating element of a drive train extending from the motor (27) to the piston (19).

13. The dispenser according to claim 11, wherein a movement sensor is provided by a pulse generator (51) attached to a moving element (27) of a drive train extending from the motor (27) to the piston (19), including the motor and the piston, generating pulses at regular steps of movement of the moving element, and a data processing device (35) counting pulses provided by the pulse generator (51).

14. The dispenser according to claim 11, wherein the dispenser is a caulking gun.

15. The dispenser according to claim 11, wherein the dispenser comprises at least two operator activated switches (7, 10; 57, 59), wherein said operator activated switches comprise a trigger switch (7) and an operation mode selection switch (10).

16. A method of operating a motorized viscous material dispenser (1), comprising selecting a first dispensing mode, recording at least one operation parameter value while dispensing material at a dispensing event in accordance with an operator's operation of the dispenser and storing at least one operation parameter value indicative of the dispensing event, selecting a second dispensing mode and operating in said second dispensing mode by dispensing upon operation by an operator material in accordance with the at least one stored operation parameter value,
wherein the at least one operation parameter comprises a count of revolutions during the dispensing event of a rotating element of a drive train (29) extending from a motor (27) to a piston (19).

17. The method according to claim 16 of operating a motorized viscous material dispenser (1) comprising a trigger switch (7; 57, 59) said method comprising registration upon activation of said trigger switch a start of a dispensing event and registration upon deactivation of said trigger switch an end of said dispensing event.

18. The method according to claim 16, wherein dispensing is terminated upon termination of operation by the operator.

* * * * *